US012030062B2

(12) United States Patent
Jankolovits et al.

(10) Patent No.: US 12,030,062 B2
(45) Date of Patent: Jul. 9, 2024

(54) METHODS FOR FLOTATION RECOVERY OF VALUE MATERIAL FROM COARSE-SIZED PARTICLES

(71) Applicant: Cytec Industries Inc., Princeton, NJ (US)

(72) Inventors: Joseph Jankolovits, Milford, CT (US); Tarun Bhambhani, Wilton, CT (US); Devarayasamudram R. Nagaraj, Ridgefield, CT (US)

(73) Assignee: Cytec Industries Inc., Princeton, NJ (US)

( * ) Notice: Subject to any disclaimer, the term of this patent is extended or adjusted under 35 U.S.C. 154(b) by 1173 days.

(21) Appl. No.: 16/157,249

(22) Filed: Oct. 11, 2018

(65) Prior Publication Data

US 2019/0111442 A1 Apr. 18, 2019

Related U.S. Application Data

(60) Provisional application No. 62/571,480, filed on Oct. 12, 2017.

(51) Int. Cl.
*B03D 1/006* (2006.01)
*B03D 1/012* (2006.01)
*B03D 1/02* (2006.01)
*B03D 1/14* (2006.01)

(52) U.S. Cl.
CPC ............. *B03D 1/006* (2013.01); *B03D 1/012* (2013.01); *B03D 1/02* (2013.01); *B03D 1/14* (2013.01); *B03D 2201/02* (2013.01); *B03D 2203/02* (2013.01)

(58) Field of Classification Search
CPC ...... B03D 1/006; B03D 1/12; B03D 2201/02; B03D 2203/02; B03B 5/66
See application file for complete search history.

(56) References Cited

U.S. PATENT DOCUMENTS

| | | | | |
|---|---|---|---|---|
| 136,657 A | | 3/1873 | Lane et al. | |
| 3,355,017 A | | 11/1967 | Paul et al. | |
| 3,642,464 A | * | 2/1972 | Dorenfeld | C01G 19/00 209/11 |
| 5,057,209 A | * | 10/1991 | Klimpel | B03D 1/008 252/61 |
| 5,173,176 A | * | 12/1992 | Klimpel | B03D 1/012 252/61 |
| 6,425,485 B1 | | 7/2002 | Mankosa et al. | |
| 2013/0092603 A1 | * | 4/2013 | Nagaraj | B03D 1/014 252/61 |
| 2015/0108045 A1 | * | 4/2015 | Mankosa | B03D 1/1443 261/121.1 |
| 2015/0182973 A1 | * | 7/2015 | Mankosa | B03D 1/02 209/12.1 |

FOREIGN PATENT DOCUMENTS

| | | | | |
|---|---|---|---|---|
| CN | 201930843 U | | 8/2011 | |
| WO | WO-8700451 A1 | * | 1/1987 | B03D 1/14 |
| WO | 2016100704 A1 | | 6/2016 | |

OTHER PUBLICATIONS

Trahar, W.J., A Rational Interpretation of the Ruole of Particle Size in Flotation, Int. J. Miner, Process, 1981. 8:p. 289-327.
Curry, J.A., M.J.L. Ismay, and G.J. Jameson, Mineoprating Costs and the Potential Impacts of Energy and Grinding Miner, Eng. 2014, 56: p. 70-80.
Jameson, G.J. Advances in Fine and Coarse Particle Flotation. Can. Metallurg. Quart., 2010. 49(4): p. 325-330.
Luttrell, G.H., et al. Development of High-Efficiency Hydraulic Separators, Miner, Metallurg. Process., 2006. 23((1): p. 33-39.
Kohmuench, J., et al., Implementation of the Hydrofloat Technology at the South Fort Meade Mine, in SME Annual Meeting & Exhibit. 2007. p. 8.
Awatey, B., et al., Optimization of Operating Parameters for Coarse Sphalerite Flotation in the Hydrofloat Fluidised-Bed Separator, Miner. Eng., 2013. 50-51: p. 99-105.
Awatey, B., W. Skinner and M. Zanin, Incorporating Fluidised-Bed Flotation Into a Conventional Flotation Flowsheet: A Focus on Energy Implications of Coarse Particle Recovery. Powder Tech., 2015. 275 : p. 85-93.
Paiva, M and J. Rubio, Factors Affecting the Floto-Elutriation Process Efficiency of a Copper Sulfide Mineral. Miner. Eng., 2016. 86: p. 59-65.
Jameson, G.J., New Directions in Flotation Machine Design, Miner. Eng., 2010. 23(11-13): p. 835-841.
Mikumo, K., H. Kawai, and A. Matsuoka, Surface-Active Compounds. IV. Higher Sodium Xanthates. Kogyo Kagaku Zasshi, 1946. 49: p. 129-132.
Hamilton, I.C. and R. Woods, Surfactant Properties of Alkyl Xanthates. Int. J. Min. Process., 1986. 17: p. 113-120.

(Continued)

*Primary Examiner* — Joseph C Rodriguez
(74) *Attorney, Agent, or Firm* — Osha Bergman Watanabe & Burton LLP

(57) ABSTRACT

Methods and systems for the flotation recovery of value materials from sulfide mineral sources are disclosed. The flotation recovery of the value materials is performed in a fluidized bed flotation cell utilizing collector materials that include at least one hydrocarbyl group and at least one functional group including sulfur on the hydrocarbyl group, and the hydrocarbyl group includes 2 or more aliphatic carbons and 6 or more total carbons. The methods and systems of the present disclosure advantageously allow for improved recovery of coarse-sized particles, which reduces time and energy expending during sample grinding stages. The methods and systems of the present disclosure also do not exhibit the detrimental frothing behaviors which can be associated with long-chain collectors typically having 6 or more carbon atoms. The systems and methods can be incorporated into existing processing systems to treat samples before or after conventional processing stages.

18 Claims, No Drawings

(56) References Cited

OTHER PUBLICATIONS

Ackerman, P.K et al., Evaluation of Flotation Collectors for Copper Sulfides and Pyrite, III. Effect of Xanthate Chain Length and Branching. Intl. J. Min. Process., 1987. 21:p. 141-156.

Wottgen, EL. and H. Gruner, Relations Between Collector Efficiency and Particle Size of Minerals. Cassiterite and Galena. Abhandlungen Der Deutschen Akademie Der Wissenschaften Zu Berlin, Klasse Fuer Chemie, Geologie Und Biologie, 1967. 1966(6): p. 409-422.

* cited by examiner

METHODS FOR FLOTATION RECOVERY OF VALUE MATERIAL FROM COARSE-SIZED PARTICLES

CROSS-REFERENCE TO RELATED APPLICATIONS

This application claims benefit of priority to U.S. Provisional Application No. 62/571,480 filed Oct. 12, 2017, which is incorporated herein by reference in its entirety.

FIELD OF THE INVENTION

The present disclosure relates generally to flotation recovery of value materials, particularly to flotation of sulfide minerals and reagents useful therein.

BACKGROUND OF THE INVENTION

The majority of flotation recovery of sulfide minerals today is performed in banks of mechanically agitated cells. Air bubbles are passed through the suspended slurry, typically having from 10 to 50% solids, with collisions between the bubbles and target particles resulting in selective attachment of hydrophobic species to the bubbles. The bubble-particle aggregates rise through the slurry to the top of the cell, where the species are concentrated and removed either as effluent, a product, or a concentrate for further processing and concentration. These conventional cells operate in the free-settling regime, i.e., wherein the settling of a particle is not affected by adjacent particles. The free-settling regime is typically achieved by maintaining a dilute slurry with a weight % solids of about 10% to about 50% and having a low apparent viscosity, although in the case of high aspect ratio minerals, a slurry with a weight % solids even as low as 20% can have high apparent viscosity.

In order to render the target particles as hydrophobic species, collector materials are added to the value material sample. Collectors are typically molecules with a mineral selective functional group and a hydrocarbon tail. The mineral selective functional group is configured to adsorb onto the target particles. The hydrocarbon tail then provides hydrophobicity to the particle.

Flotation recovery of value materials produces a froth phase of concentrated material at the surface of the slurry. Frothers, which are typically short-chain alcohols and glycols, are used to aid in the formation of a froth phase most conducive to selective and efficient target mineral recovery. Collectors can influence the behavior of the froth phase, and are capable of causing either excessive or very unstable froths, both highly undesirable, particularly in collectors with longer hydrocarbon tails. Thus, most collectors in use for sulfide mineral recovery in conventional agitated mechanical flotation cells include a shorter hydrocarbon tail. So called “long-chain” collectors are not used or viable in these conventional flotation cells because of their poor metallurgical performance and poor frothing conditions, namely increased frothing, which is detrimental to flotation in those cells.

Poor efficiency is especially seen when attempting flotation recovery on coarse-sized particles. As a result, value minerals are subjected to intense grinding steps to reduce particle size typically below 100-150 μm down to as low as 5 μm or lower. In an effort to reduce the need for these highly energy intensive grinding processes, fluidized bed flotation cells are being developed. See, e.g., U.S. Pat. No. 4,822,493; U.S. PG Pub 2016/0136657; and Int. Pat. Pub. 2016/100704, each incorporated herein by reference in its entirety. The important distinction between a mechanical cell and a fluidized bed cell is the presence of a bed of particles in a hindered settling regime. Fluidized bed cells may or may not be operated with an impeller, while mechanical cells require the use of an impeller. These flotation cells operate in the so-called “hindered settling regime”, where the solids density (wt. % solids) and apparent viscosity are high. With lesser mechanical energy in the slurry, the stability of bubble-particle aggregates for the +150 micron size particles is greater. Accordingly, these designs have shown increased flotation efficiency of particles greater than 150 μm. However, collectors for use in such fluidized bed flotation cells, and attendant operating conditions in these cells, require further improvement to increase coarse-sized particle recovery efficiency. Collectors that provide for increased recovery of coarse-sized particles, which leads to reduced grinding costs from processing a coarser feed (i.e., above 150 μm), would be a useful advance in the art and could find rapid acceptance in the industry.

SUMMARY OF THE INVENTION

The forgoing and additional objects are attained in accordance with the principles of the invention wherein the inventors detail the surprising discovery that the use of long-chain (i.e., 6 or more carbons) organic sulfur containing collectors in fluidized bed cells provide superior metallurgy with respect to recovery of coarse-sized particles and do not impart detrimental froth behavior like they do when used for traditional (i.e., mechanical) flotation cells, which use short-chain (i.e., less than 6 carbons) organic collectors for this reason.

In at least one aspect, the present disclosure is directed to methods for flotation recovery of sulfide minerals, the methods including providing a sulfide mineral source intermixed with a first liquid as a slurry, flowing a second liquid through the slurry to produce a fluidized bed, and intermixing at least one collector material and the sulfide mineral source, and bubbling a gas through the fluidized bed to recover sulfide minerals from the sulfide mineral source, wherein the collector material includes at least one hydrocarbyl group and at least one functional group including sulfur on the hydrocarbyl group, and wherein the hydrocarbyl group includes 2 or more aliphatic carbons and 6 or more total carbons.

In certain embodiments, the methods can include intermixing a sulfide mineral source with a first liquid to produce a slurry, flowing a second liquid through the slurry to produce a fluidized bed, and intermixing at least one collector material and the sulfide mineral source and bubbling a gas through the fluidized bed to recover sulfide minerals from the sulfide mineral source, wherein the collector material is composed of di-2-ethyl hexyl dithiophosphate, C8-dithiophosphinate, C6-dithiocarbamate, C8-dithiocarbamate, associated sodium salts, associated potassium salts, associated ammonium salts, or combinations thereof.

In another aspect, the present disclosure is directed to systems for flotation recovery of sulfide minerals including an intermixing tank, a liquid flow stream positioned so the intermixing tank is operable as a fluidized bed, a gas flow stream, a sulfide mineral slurry feed into the intermixing tank, and a collector material including at least one hydrocarbyl group and at least one functional group including sulfur on the hydrocarbyl group, wherein the hydrocarbyl group includes 2 or more aliphatic carbons and 6 or more total carbons.

This summary of the invention does not list all necessary characteristics and, therefore, subcombinations of these characteristics, steps or elements may also constitute an invention. Accordingly, these and other objects, features and advantages of this invention will become apparent from the following detailed description of the various embodiments of the invention taken in conjunction with the accompanying Examples.

DETAILED DESCRIPTION OF CERTAIN EMBODIMENTS OF THE INVENTION

The present invention will now be described more fully hereinafter. The invention may be embodied in many different forms and should not be construed as limited to the embodiments set forth herein; rather, these embodiments are provided so that this disclosure will satisfy applicable legal requirements. As used herein and in the appended claims, the singular forms include plural referents unless the context clearly dictates otherwise.

Those skilled in the art will appreciate that while preferred embodiments are discussed in more detail below, multiple embodiments of the collector system and flotation processes described herein are contemplated as being within the scope of the present invention. Thus, it should be noted that any feature described with respect to one aspect or one embodiment of the invention is interchangeable and/or combinable with another aspect or embodiment of the invention unless otherwise stated.

Furthermore, for purposes of describing the present invention, where an element, component, or feature is said to be included in and/or selected from a list of recited elements, components, or features, those skilled in the art will appreciate that in the related embodiments of the invention described herein, the element, component, or feature can also be any one of the individual recited elements, components, or features, or can also be selected from a group consisting of any two or more of the explicitly listed elements, components, or features. Additionally, any element, component, or feature recited in such a list may also be omitted from such list.

Those skilled in the art will further understand that any recitation herein of a numerical range by endpoints includes all numbers subsumed within the recited range (including fractions), whether explicitly recited or not, as well as the endpoints of the range and equivalents. The term "et seq." is sometimes used to denote the numbers subsumed within the recited range without explicitly reciting all the numbers, and should be considered a full disclosure of all the numbers in the range. Disclosure of a narrower range or more specific group in addition to a broader range or larger group is not a disclaimer of the broader range or larger group.

The terms "comprised of," "comprising," or "comprises" as used herein includes embodiments "consisting essentially of" or "consisting of" the listed elements, and the terms "including" or "having" in context of describing the invention should be equated with "comprising".

In one aspect, the present disclosure is directed towards a method for flotation recovery of value materials from a value material source. The value material source is a source of value metals and/or minerals, including precious metals. In any or all embodiments, the value material source is a sulfide mineral source, e.g., sulfide ores, tailings, cyclone underflow, sinks, etc., or combinations thereof. In any or all embodiments, the sulfide mineral source includes Cu—Mo ores, Cu—Au ores, primary Au ores, platinum-group metals ores, Cu ores, Ni ores, Ni—Cu ores, and ores including Pb, Zn, Cu, and/or Ag. Exemplary value metals of interest include, for example, gold, silver, platinum, palladium, other platinum group metals, copper, nickel, molybdenum, cobalt, lead, and zinc. In any or all embodiments, the value material source is composed of copper-containing minerals, e.g., chalcopyrite, chalcocite, bornite, covellite; gold-containing minerals, e.g., electrum, pyrite, marcasite, Cu sulfide minerals, and arsenopyrite; molybdenum-containing minerals, e.g., molybdenite; lead-containing minerals, e.g., galena; zinc-containing minerals, e.g., sphalerite and marmatite; silver-containing minerals, e.g., argentite, freibergite, argentiferous pyrite, and argentiferous galena; nickel-containing minerals, e.g., pentlandite; platinum group metal-containing minerals, e.g., sperrylite; or combinations thereof.

In any or all embodiments, the value material source is composed of coarse-size particles. As used herein, unless explicitly defined otherwise for a particular embodiment, the term "coarse-sized particles" is used to refer to particles slurry having a p80 of 150 μm or greater. In any or all embodiments, the value material source is composed of particles slurry having a p80 of 150 μm or greater. In any or all embodiments, the value material source is composed of particles slurry having a p80 of 180 μm or greater. In any or all embodiments, the value material source is composed of particles slurry having a p80 of 210 μm or greater.

In any or all embodiments, a value material source intermixed with a first liquid as a slurry can be provided. In the same or alternate embodiments, the first liquid is water, though the invention is not limited in this regard as other liquids may be used. In the same or alternate embodiments, the slurry is provided to a fluidized bed flotation cell. In the same or alternate embodiments, a size separation process is performed on the value material source prior to being provided to the fluidized bed flotation cell. In the same or alternate embodiments, providing the slurry to the fluidized bed flotation cell is a continuous process. In the same or alternate embodiments, providing the slurry to the fluidized bed flotation cell is a semi-continuous process.

In any or all embodiments, a second liquid flows through the slurry to produce a fluidized bed. In any or all embodiments, the first liquid and the second liquid have the same composition. In any or all embodiments, the first liquid and the second liquid are from the same source. In any or all embodiments, the first liquid and the second liquid are from different sources. The fluidized bed in the fluidized bed flotation cell is operated in the "hindered-settling regime." This regime is characterized by a high solids density (wt. % solids) and high apparent viscosity. The hindered settling in the upward flow of the second liquid (e.g., water) fluidizes the bed of coarse-sized value material source particles.

In any or all embodiments, at least one collector material is intermixed with the value material source. In any or all embodiments, the collector material is a long-chain (i.e., 6 or more carbon atoms) organic compound including sulfur. In any or all embodiments, the collector material includes at least one hydrocarbyl group and at least one functional group including sulfur on the hydrocarbyl group. In any or all embodiments, the collector material includes two or more hydrocarbyl groups. In any or all embodiments, a first hydrocarbyl group has a different structure than a second hydrocarbyl group. In any or all embodiments, the hydrocarbyl group includes at least one saturated carbon. In any or all embodiments, the hydrocarbyl group is acyclic. In any or all embodiments, the hydrocarbyl group is cyclic. In any or all embodiments, the hydrocarbyl group includes an alkyl group, alkenyl group, alkynyl group, aryl group, alkaryl group, or combinations thereof. In any or all embodiments, the hydrocarbyl group is branched. In any or all embodiments, the hydrocarbyl group includes 6 or more carbons. In any or all embodiments, the hydrocarbyl group includes 2 or more aliphatic carbons and 6 or more total carbons. In any or all embodiments, the hydrocarbyl group includes between 6 and about 16 carbons. In any or all embodiments, the hydrocarbyl group includes between about 8 and about 12 carbons. In any or all embodiments, the hydrocarbyl group includes 25 or fewer carbons. In any or all embodiments, the hydrocarbyl group includes 18 or fewer carbons. In any or all embodiments, the hydrocarbyl group includes a hexyl, heptyl, octyl, nonyl, decyl, undecyl, or dodecyl chain. In any or all embodiments, the at least one functional group is selected from xanthates, xanthate esters, dithiocarbamates, dithiophosphates, dithiophosphinates, thionocarbamates, thioureas, xanthogen formates, monothiophosphates, monothiophosphinates, mercaptobenzothiazole, mercaptans, thioethers, or combinations thereof. In any or all embodiments, the collector material includes a dithiophosphate functional group and at least one hydrocarbyl group including between 6 and 12 carbons. In any or all embodiments, the collector material includes a dithiophosphinate functional group and at least one hydrocarbyl group including between 6 and 12 carbons. In any or all embodiments, the collector material includes a dithiocarbamate functional group and at least one hydrocarbyl group including between 6 and 12 carbons. In any or all embodiments, the collector material includes an alkyl, alkenyl, allyl, or aryl ester of a xanthate, dithiophosphinate, dithiophosphate, or dithiocarbamate. In any or all embodiments, the collector material includes 2-ethylhexyl xanthate, dodecyl xanthate, didodecyl dithiophosphate, dinonyl phenyl dithiophosphate, 6-alkoxy mercaptobenzothiazole, alkyl-norbornyl dithiophosphinate, alkyl-limonyl dithiophosphinate, di-2,4,4-trimethyl pentyl dithiophosphinate, di-2,4,4-trimethyl pentyl monothiophosphinate, dodecyl mercaptan, di-dodecyl dithiocarbamate, dioctyl dithiocarbamate, butoxycarbonyl octyl thionocarbamate, butoxycarbonyl octyl dithiocarbamate, alkoxycarbonyl octyl thiourea, or combinations thereof.

In any or all embodiments, the collector material includes sodium, potassium, ammonium, calcium, magnesium, alkyl ammonium, sulfonium, pyridium, imidazolium, and/or phosphonium salts of hydrocarbyl substituted xanthic acids, dithiocarbamic acids, dithiophosphoric acids, dithiophosphinic acids, monothiophosphoric acids, monothiophosphinic acid, mercaptobenzothiazoles, or combinations thereof. In any or all exemplary embodiments, the collector material is composed of di-2-ethyl hexyl dithiophosphate, di-C8-dithiophosphinate, di-C6-dithiocarbamate, di-C8-dithiocarbamate, associated sodium salts, associated potassium salts, associated ammonium salts, or combinations thereof. In any or all embodiments, the collector material is used in combination with a second collector material. In any or all embodiments, the second collector material has a different hydrocarbyl group than the first collector, i.e., the second collector material has a different-sized hydrocarbyl group than the first collector material. In any or all embodiments, the second collector material is a short-chain (i.e., less than 6 carbon atoms) organic compound. In any or all embodiments, the second collector material has the same sulfur containing functional groups as the first collector material. In any or all embodiments, the second collector material has different sulfur containing functional groups as the first collector material. In any or all embodiments, the second collector material does not include a functional group including sulfur. In any or all embodiments, the first and second collector materials are in combinations of salt and neutral forms.

In any or all embodiments, the amount of collector material intermixed with the value material source is effective to realize recovery of the value material or produce the desired separation of the value material from non-value material. In any or all embodiments, collector material intermixed with the value material source at an amount between about 1 gram per ton of value material source and about 1 kg per ton of value material source. In any or all embodiments, collector material is intermixed with the value material source at an amount between about 5 gram per ton of value material source and about 500 grams per ton of value material source. In any or all embodiments, collector material can be intermixed with the value material source at an amount between about 10 gram per ton of value material source and about 30 grams per ton of value material source.

In any or all embodiments, the collector material can be combined with other reagents. In any or all embodiments, these other reagents include, but are not limited to, a frother, a surfactant, a pH modifier, a flotation depressant, a rheology modifier, an activator, one or more hydrocarbon oils, or combinations thereof. In any or all embodiments, the frother is composed of aliphatic alcohols (e.g., C5-C8 chain length, specifically MIBC, hetanols, octanols, 2-ethyl hexanol, isoamyl alcohol); poly glycols and their mono-alkyl ethers (e.g., MW range 200-500, alkyl groups for ethers are C1-C4), cresylic acids, pine oil, tri-alkoxy alkane, (e.g., tri-ethoxy butane), or combinations thereof, sometimes containing small amounts of low MW aldehydes ketones and esters; polymers thereof; or combinations thereof. In any or all embodiments, the surfactant is composed of alkylene glycol esters, sulfosuccinates, or combinations thereof. In any or all embodiments, the concentration of surfactants in the collector material is from about 0.1% to about 10% by weight. In any or all embodiments, the pH modifier is composed of lime, sodium hydroxide, sodium carbonate, or combinations thereof. In any or all embodiments, the flotation depressant and/or rheology modifier are composed of sodium silicates (oligomers and polymers), polyacrylates, starches, guars, polyphosphates, carboxymethylcellulose, synthetic water-soluble polymers, or combinations thereof. In any or all embodiments, the activator activates value materials (e.g., sulfide minerals) to enhance the hydrophobization of those value materials. In any or all embodiments, the activator is composed of copper sulfate, sodium hydrosulfide, lead nitrate, or combinations thereof.

In any or all embodiments, a gas is bubbled through the fluidized bed to recover value materials from the value material source. In any or all embodiments, the gas is air, though other gases are contemplated and the invention is not limited to the gas being air. In any or all embodiments, flow of the second liquid and gas bubbling occur simultaneously. Collector-coated value particles attach to the gas bubbles and rise upwards with the flow of the second liquid (e.g., water) and are collected in the form of a value material concentrate. In any or all embodiments, clusters of bubbles and particles are formed. In any or all embodiments, gas bubbling is effective to float a recovered portion having an increased concentration of value material. In any or all embodiments, the fluidized bed flotation cell is operated in a reverse-flotation process, where gas bubbling is effective to float off non-value materials such as sulfide or non-sulfide gangue, such that the concentration of value material in the value material source is increased. One exemplary embodiment of such a reverse flotation process is the removal of pyrite from sulfide mineral sources. Another exemplary embodiment is the removal of pyrrhotite from nickel mineral sources. In any or all embodiments, the frother is added prior to gas bubbling. In any or all embodiments, the tailings are removed from the cell to separate them from the concentrate.

In any or all embodiments of the method, the value material source is processed by a primary, secondary, or tertiary mill; a ball mill; a rod mill; a regrind mill; a mechanical flotation cell; a roughing stage; a classification stage; a primary, secondary, or tertiary crusher; a size separation stage; a tailings processing stage; or combinations thereof. In any or all embodiments, the fluidized bed flotation cell and associated recovery of value materials is integrated within an existing material processing system. Those having skill in the art would recognize where such integration would be appropriate and how existing systems can be modified, without undue experimentation, to integrate the fluidized bed flotation cell and associated recovery of value materials according to any or all of the embodiments of the present disclosure into that system.

Referring again to intermixing, in any or all embodiments, the collector material can be intermixed with the value material source before intermixing with the first liquid. In any or all embodiments, collector material is first intermixed with the first liquid. In any or all embodiments, the collector material is intermixed with the value material source prior to the slurry being provided to the fluidized bed flotation cell. In any or all embodiments, the collector material is intermixed with the value material source after the slurry is provided to the fluidized bed flotation cell. Those having skill in the art would recognize that the collector material added in one unit of a system can flow and impact other stages of that system, for example, those described above with respect to value material processing. Therefore, those having ordinary skill in the art would recognize, without undue experimentation, where in a processing system the collector can be added to realize flotation recovery of the value material.

In one aspect, the present disclosure is directed to a fluidized bed flotation cell consistent with any or all embodiments of the present disclosure. The invention is not limited to the fluidized bed flotation cell described herein; the following description is included as one representative embodiment of the invention disclosed herein. In any or all embodiments, fluidized bed flotation cell includes an intermixing tank including a liquid flow stream and a gas flow stream. As discussed above, liquid flow stream provides the second liquid to produce a fluidized bed. Also as discussed above, a gas flow stream enables the bubbling of gas to a slurry in an intermixing tank and subsequent flotation of materials near the top of the tank. In any or all embodiments, a feed stream is positioned to feed a value material source to the intermixing tank for recovery of value materials (e.g., value minerals and/or value/precious metals) from that value material source. In any or all embodiments, the feed stream is a sulfide mineral slurry feed. In any or all embodiments, the feed stream is a conveyor. In any or all embodiments, the feed stream is positioned to feed the value material source to a base of intermixing tank. In any or all embodiments, the feed stream is positioned to feed the value material source to the middle of intermixing tank. As discussed above, in any or all embodiments, the value material source that is fed to intermixing tank is composed of coarse-sized particles.

As discussed above, the cell is operated in the "hindered settling regime," where the solids density and apparent viscosity are high. In any or all embodiments, fluidized bed flotation cell includes an impeller; however, in certain embodiments, the fluidized bed flotation cell does not include an impeller. In any or all embodiments, the fluidized bed flotation cell includes one or more outlets for removing tailings or concentrated value materials from intermixing tank.

In any or all embodiments, a plurality of fluidized bed flotation cells are provided to process the value material source. In any or all embodiments, the plurality of fluidized bed flotation cells are configured in series. In any or all embodiments, the plurality of fluidized bed flotation cells are configured in parallel. In any or all embodiments, a plurality fluidized beds are provided in the intermixing tank. As discussed above, the intermixing tank can be integrated into an existing processing system. In any or all embodiments, the intermixing tank is integrated before and/or at least one of a primary, secondary, or tertiary mill; a ball mill; a rod mill; a regrind mill; a mechanical flotation cell; a roughing stage; a classification stage; a primary, secondary, or tertiary crusher; a size separation stage; high-pressure grinding rolls; a tailings processing stage; or combinations thereof.

While various embodiments may have been described herein in singular fashion, those skilled in the art will recognize that any of the embodiments described herein can be combined in the collective. In view of the aforementioned discussion of the present invention, the invention includes at least the following embodiments:

Embodiment 1

A method for flotation recovery of sulfide minerals, the method comprising:

providing a sulfide mineral source intermixed with a first liquid as a slurry;

flowing a second liquid through the slurry to produce a fluidized bed; and intermixing at least one collector material and the sulfide mineral source and bubbling a gas through the fluidized bed to recover sulfide minerals from the sulfide mineral source, wherein the collector material includes at least one hydrocarbyl group and at least one functional group including sulfur on the hydrocarbyl group, and the hydrocarbyl group includes 2 or more aliphatic carbons and 6 or more total carbons.

Embodiment 2

A method according to embodiment 1, wherein the at least one functional group is selected from xanthates, xanthate esters, dithiocarbamates, dithiophosphates, dithiophosphinates, thionocarbamates, thioureas, xanthogen formates, monothiophosphates, monothiophosphinates, mercaptobenzothiazole, mercaptans, thioethers, or combinations thereof.

Embodiment 3

A method according to any of embodiments 1-2, wherein the hydrocarbyl group includes 18 or fewer carbons.

Embodiment 4

A method according to embodiment 1 or embodiment 2, wherein the hydrocarbyl group comprises a hexyl, heptyl, octyl, nonyl, decyl, undecyl, or dodecyl chain.

Embodiment 5

A method according to any one of embodiments 1-4, wherein the hydrocarbyl group is branched or an alkaryl group.

Embodiment 6

A method according to embodiment 1 or embodiment 2, wherein the collector material comprises 2-ethylhexyl xanthate, dodecyl xanthate, didodecyl dithiophosphate, di-2-ethylhexyl dithiophosphates, di-nonyl phenyl dithiophosphate, 6-alkoxy mercaptobenzothiazole, alkyl-norbornyl dithiophosphinate, alkyl-limonyl dithiophosphinate, di-2,4,4-trimethyl pentyl dithiophosphinate, di-2,4,4-trimethyl pentyl monothiophosphinate, di-dodecyl dithiocarbamate, dioctyl dithiocarbamate, butoxycarbonyl octyl thionocarbamate, butyl octyl thionocarbamate, butoxycarbonyl octyl thiourea, butoxycarbonyl octyl dithiocarbamate, butoxycarbonyl dodecyl dithiocarbamate, 2-ethylhexyl allyl xanthate ester or combinations thereof.

Embodiment 7

A method according to any one of embodiments 1-6, wherein the collector material comprises sodium, potassium, or ammonium salts of hydrocarbyl substituted xanthic acids, dithiocarbamic acids, dithiophosphoric acids, dithiophosphinic acids, monothiophosphoric acids, monothiophosphinic acids, mercaptobenzothiazoles, or combinations thereof.

Embodiment 8

A method according to any one of embodiments 1-7, further comprising providing the slurry to a fluidized bed flotation cell.

Embodiment 9

A method according to any one of embodiments 1-8, wherein intermixing at least one collector material with the sulfide minerals source occurs:

prior to providing the slurry to a fluidized bed flotation cell; or after providing the slurry to a fluidized bed flotation cell.

Embodiment 10

A method according to embodiment 8, wherein providing the slurry to a fluidized bed flotation cell occurs after at least one of:

sulfide mineral source processing by a primary mill;
sulfide mineral source processing by a secondary mill;
sulfide mineral source processing by a tertiary mill;
sulfide mineral source processing by a ball mill;
sulfide mineral source processing by a rod mill;
sulfide mineral source processing by a regrind mill;
sulfide mineral source processing by a mechanical flotation cell;
sulfide mineral source processing in a roughing stage;
sulfide mineral source processing in a classification stage;
sulfide mineral source processing in a primary crusher;
sulfide mineral source processing in a secondary crusher;
sulfide mineral source processing in a tertiary crusher;
sulfide mineral source processing in a size separation stage;
high-pressure grinding rolls; and
a tailings processing stage.

Embodiment 11

A method according to any one of embodiments 1 to 10, wherein an amount of collector material intermixed with the sulfide mineral source is between about 1 gram per ton of sulfide mineral source and about 500 gram per ton of sulfide mineral source.

Embodiment 12

A method according to any one of embodiments 1 to 11, further comprising performing a size separation process on the slurry before flowing a liquid through the slurry to produce a fluidized bed.

Embodiment 13

A method according to any one of embodiments 1 to 12, wherein flowing a second liquid through the slurry to produce a fluidized bed and bubbling a gas through the fluidized bed occur simultaneously.

Embodiment 14

A method according to any one of embodiments 1 to 7 and 13, wherein the at least one collector material includes a frother, a surfactant, a pH modifier, a flotation depressant, a rheology modifier, an activator, one or more hydrocarbon oils, or combinations thereof.

Embodiment 15

A method according to any one of embodiments 1 to 14, wherein the sulfide mineral source is comprised substantially of coarse-sized particles having a p80 of 150 μm or greater.

Embodiment 16

A method according to any one of embodiments 1 to 15, wherein the sulfide mineral source is comprised of sulfide ores, tailings, cyclone underflow, sinks, or combinations thereof.

Embodiment 17

A system for flotation recovery of sulfide minerals comprising:

an intermixing tank;

a liquid flow stream positioned so the intermixing tank is operable as a fluidized bed;

a gas flow stream;

a sulfide mineral slurry feed into the intermixing tank; and a collector material including at least one hydrocarbyl group and at least one functional group including sulfur on the hydrocarbyl group, wherein the hydrocarbyl group includes 2 or more aliphatic carbons and 6 or more total carbons.

Embodiment 18

A system according to embodiment 17, wherein the at least one functional group is selected from xanthates, xanthate esters, dithiocarbamates, dithiophosphates, dithiophosphinates, thionocarbamates, thioureas, xanthogen formates, monothiophosphates, monothiophosphinates, mercaptobenzothiazole, mercaptans, thioethers, or combinations thereof.

Embodiment 19

A system according to embodiment 17 or embodiment 18, wherein the hydrocarbyl group includes 18 or fewer carbons.

Embodiment 20

A system according to embodiment 17 or embodiment 18, wherein the hydrocarbyl group comprises a hexyl, heptyl, octyl, nonyl, decyl, undecyl, or dodecyl chain.

Embodiment 21

A system according to any one of embodiments 17 to 20, wherein the hydrocarbyl group is branched or an alkaryl group.

Embodiment 22

A system according to embodiment 17 or embodiment 18, wherein the collector material comprises 2-ethylhexyl xanthate, dodecyl xanthate, didodecyl dithiophosphate, di-2-ethylhexyl dithiophosphates, di-nonyl phenyl dithiophosphate, 6-alkoxy mercaptobenzothiazole, alkyl-norbornyl dithiophosphinate, alkyl-limonyl dithiophosphinate, di-2,4,4-trimethyl pentyl dithiophosphinate, di-2,4,4-trimethyl pentyl monothiophosphinate, di-dodecyl dithiocarbamate, dioctyl dithiocarbamate, butoxycarbonyl octyl thionocarbamate, butyl octyl thionocarbamates, butoxycarbonyl octyl thiourea, butoxycarbonyl octyl dithiocarbamate, butoxycarbonyl dodecyl dithiocarbamate, 2-ethylhexyl allyl xanthate ester or combinations thereof.

Embodiment 23

A system according to any one of embodiments 17 to 22, wherein the collector material includes sodium, potassium, or ammonium salts of hydrocarbyl substituted xanthic acids, dithiocarbamic acids, dithiophosphoric acids, dithiophosphinic acids, monothiophosphoric acids, monothiophosphinic acids, mercaptobenzothiazoles, or combinations thereof.

Embodiment 24

A system according to any one of embodiments 17 to 23, wherein the intermixing tank includes a base and a conveyor positioned to feed the sulfide mineral source to the base.

Embodiment 25

A system according to any one of embodiments 17 to 24, further comprising a plurality of intermixing tanks positioned in series.

Embodiment 26

A system according to any one of embodiments 17 to 25, further comprising a plurality of fluidized beds positioned in series.

Embodiment 27

A system according to any one of embodiments 17 to 26, wherein the intermixing tank is positioned after at least one of a primary mill, a secondary mill, a tertiary mill, a ball mill, a rod mill, a regrind mill, a mechanical flotation cell, a roughing stage, a classification stage, a primary crusher, a secondary crusher, a tertiary crusher, size separation stage, high-pressure grinding rolls, and a tailings processing stage.

Embodiment 28

A system according to any one of embodiments 17 to 27, wherein the at least one collector material further comprises a frother, a surfactant, a pH modifier, a flotation depressant, a rheology modifier, an activator, one or more hydrocarbon oils, or combinations thereof.

Embodiment 29

A system according to any one of embodiments 17 to 28, wherein the sulfide mineral source is comprised substantially of coarse-sized particles having a p80 of 150 μm or greater.

Embodiment 30

A method for flotation recovery of sulfide minerals, the method comprising:

intermixing a sulfide mineral source with a first liquid to produce a slurry;

flowing a second liquid through the slurry to produce a fluidized bed; and intermixing at least one collector material and the sulfide mineral source and bubbling a gas through the fluidized bed to recover sulfide minerals from the sulfide mineral source, wherein the collector material is composed of di-2-ethyl hexyl dithiophosphate, C8-dithiophosphinate, C6-dithiocarbamate, C8-dithiocarbamate, associated sodium salts, associated potassium salts, associated ammonium salts, or combinations thereof.

Embodiment 31

A method according to embodiment 30, further comprising providing the slurry to a fluidized bed flotation cell.

Embodiment 32

A method according to embodiment 30 or embodiment 31, wherein intermixing at least one collector material with the sulfide minerals source occurs:

prior to providing the slurry to a fluidized bed flotation cell; or after providing the slurry to a fluidized bed flotation cell.

Embodiment 33

A method according to any one of embodiments 30 to 32, wherein providing the slurry to a fluidized bed flotation cell occurs after at least one of:

sulfide mineral source processing by a primary mill;
sulfide mineral source processing by a secondary mill;
sulfide mineral source processing by a tertiary mill;
sulfide mineral source processing by a ball mill;
sulfide mineral source processing by a regrind mill;
sulfide mineral source processing by a mechanical flotation cell;
sulfide mineral source processing in a roughing stage;
sulfide mineral source processing in a classification stage;

sulfide mineral source processing in a primary crusher;
sulfide mineral source processing in a secondary crusher;
sulfide mineral source processing in a tertiary crusher;
sulfide mineral source processing in a size separation stage;
high-pressure grinding rolls; and
a tailings processing stage.

Embodiment 34

A method according to any one of embodiments 30 to 33, wherein an amount of collector material intermixed with the sulfide mineral source is between about 1 gram per ton sulfide mineral source and about 500 gram per ton sulfide mineral source.

Embodiment 35

A method according to any one of embodiments 30 to 34, further comprising performing a size separation process on the slurry before flowing a liquid through the slurry to produce a fluidized bed.

Embodiment 36

A method according to any one of embodiments 30 to 35, wherein flowing a second liquid through the slurry to produce a fluidized bed and bubbling a gas through the fluidized bed occur simultaneously.

Embodiment 37

A method according to any one of embodiments 30 to 36, wherein the at least one collector material further comprises a frother, a surfactant, a pH modifier, a flotation depressant, a rheology modifier, an activator, one or more hydrocarbon oils, or combinations thereof.

Embodiment 38

A method according to any one of embodiments 30 to 37, wherein the sulfide mineral source is comprised substantially of coarse-sized particles having a p80 of 150 μm or greater.

Embodiment 39

A method according to any one of embodiments 30 to 38, wherein the ground sulfide mineral source is comprised of sulfide ores, tailings, cyclone underflow, sinks, or combinations thereof.

Embodiment 40

A composition of a fluidized bed reactor comprising:
a ground sulfide mineral source;
at least one collector material as defined in any one of embodiments 1 to 7 and 11; and
a fluidizing liquid producing a fluidized bed.

EXAMPLES

The following examples are provided to assist one skilled in the art to further understand certain embodiments of the present disclosure. These examples are intended for illustration purposes only and are not to be construed as limiting the scope of the present disclosure.

Example 1

A laboratory-size fluidized bed flotation cell was constructed with an inlet for an air/water/frother mixture and an outlet for the "tailings". Solid sample was fed into the middle of the fluidized bed flotation cell using a vibrating conveyor. A substantially constant upward flow of water was maintained in the fluidized bed flotation cell, which was allowed to constantly flow over the top. The flowrate of water was 8 liters per minute. Air and water were substantially constantly fed to the unit while the solid sample was added. A larger sample of approximately 22 kg was used to build the fluidized bed sample in this initial test. Subsequent tests used 15 kg of sample per test.

A copper ore sample was sized to remove material finer than 150 μm in size. The material was then put in the intermixing tank with approximately 4 liters of water resulting in a solids density of approximately 80%. The collectors of choice were prepared as aqueous solutions if they were soluble in water. Otherwise, they were added as-is, or prepared as a solution with a different compatible solvent. The collector of choice was then added at a dosing rate of 20 grams per ton of sample, along with 1 gram per ton of lime, and "conditioned" for 10 minutes. The pH of the resultant slurry was measured and found to be 10.2. The gas was then turned on, producing very fine bubbles that permeated and "dilated" the bed. Hydrophobized particles attached to air bubbles then floated to the surface of the bed, carried upwards by the flow of water. Overflowing solids are collected via a screen or a pan. The tailings discharge rate was controlled by a valve such that the bed height is held constant by maintaining the discharge rate as close to the feed rate as possible.

When the fluidized bed had stabilized samples of the concentrate and tailings were collected for a duration of time sufficient to obtain a sample large enough for assay. The samples were dried in an oven and sieved into three or four size fractions, each of which was assayed separately.

The results from the above tests are tabulated as Example Numbers 1 through 6 in Table 1 below.

TABLE 1

| Example number | Reagent | Size Fraction | Recovery (%) |
|---|---|---|---|
| 1C | sodium isobutyl xanthate | +200 microns | 35.6 |
| | (chain length = 4) | −200 + 150 microns | 98.8 |
| 2 | 2 ethyl-hexyl xanthate | +200 microns | 50.4 |
| | (Carbon chain length = 8) | −200 + 150 microns | 97.6 |
| 3 | dodecyl xanthate (Carbon | +200 microns | 72.6 |
| | chain length = 12) | −−200 + 150 microns | 99.2 |
| 4C | sodium di-isobutyl dithiophosphates | +200 microns | 42.9 |
| | (Carbon chain length = 4) | −200 + 150 microns | 99.0 |
| 5 | di 2-ethyl hexyl dithiophosphates | +200 microns | 50.3 |
| | (Carbon chain length = 8) | −200 + 150 microns | 98.8 |
| 6 | di dodecyl dithiophosphates | +200 microns | 65.2 |
| | (Carbon chain length = 12) | −200 + 150 microns | 99.1 |

*C in Example Number indicates "comparative".

Example 2

The procedure was substantially the same as in Example 1, except no lime was added. The pH of the slurry was measured and found to be 8.5. The results from these tests are tabulated as Example Numbers 7C and 8 in Table 2 below.

TABLE 2

| Example number | Reagent | Size Fraction | Recovery (%) |
|---|---|---|---|
| 7C | sodium isobutyl xanthate | +200 microns | 78.1 |
| | (chain length = 4) | −200 microns | 97.7 |
| 8 | 2 ethyl-hexyl xanthate | +200 microns | 85.8 |
| | (Carbon chain length = 8) | −200 microns | 98.8 |

*C in Example Number indicates "comparative".

In any or all embodiments, the methods and systems of the present disclosure advantageously isolate value materials in sulfide mineral sources. In any or all embodiments, the methods and systems of the present disclosure advantageously remove non-value sulfides and non-sulfide gangue from the value material source. The fluidized bed flotation cell in the value material flotation recovery of the present disclosure increases bubble-particle contact and reduces the mechanical energy to suspend the particles in the liquid phase. With less mechanical energy in the slurry, the stability of bubble-particle aggregates is greater, resulting in higher recoveries of coarse-sized particles. Further, since coarse-sized particles can be recovered, value material sources need not be subjected to as intensive or time-consuming grinding steps, which reduces grinding cost, time, and energy. The fluidized bed flotation cell can also be operated with improved water management and consumption, improved tailing management, higher throughputs, and improved selectivity in subsequent cleaning stages. Finally, long-chain collectors such as those described in the present disclosure provide improved recovery of value materials relative to analogous short-chain collectors. Long-chain collectors are not viable and are thus not used in conventional or mechanical recovery cells because they do not provide acceptable metallurgical performance. However, the expected disadvantageous frothing behavior from long-chain collectors is not present in the fluidized bed flotation cells of the present disclosure.

While the invention has been described with reference to a preferred embodiment, it will be understood by those skilled in the art that various changes may be made and equivalents may be substituted for elements thereof without departing from the scope of the invention. Further, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for flotation recovery of sulfide minerals, the method comprising:

providing a sulfide mineral source intermixed with a first liquid as a slurry;

flowing a second liquid through said slurry to produce a fluidized bed; and intermixing at least one collector material and said sulfide mineral source and bubbling a gas through said fluidized bed to recover sulfide minerals from the sulfide mineral source, wherein said collector material includes at least one hydrocarbyl group and at least one functional group including sulfur on said hydrocarbyl group, and said hydrocarbyl group includes 2 or more aliphatic carbons and 6 or more total carbons, wherein said at least one functional group is selected from xanthates, xanthate esters, dithiocarbamates, dithiophosphates, dithiophosphinates, thionocarbamates, thioureas, xanthogen formates, monothiophosphates, monothiophosphinates, mercaptobenzothiazole, mercaptans, thioethers, or combinations thereof.

2. The method according to claim 1, wherein said at least one functional group is selected from xanthates, xanthate esters, dithiophosphates, or combinations thereof.

3. The method according to claim 1, wherein said hydrocarbyl group includes 18 or fewer carbons.

4. The method according to claim 1, wherein said hydrocarbyl group comprises a hexyl, heptyl, octyl, nonyl, decyl, undecyl, or dodecyl chain.

5. The method according to claim 1, wherein said hydrocarbyl group is branched or an alkaryl group.

6. The method according to claim 1, wherein said collector material comprises 2-ethylhexyl xanthate, dodecyl xanthate, didodecyl dithiophosphate, di-2-ethylhexyl dithiophosphates, di-nonyl phenyl dithiophosphate, 6-alkoxy mercaptobenzothiazole, alkyl-norbornyl dithiophosphinate, alkyl-limonyl dithiophosphinate, di-2,4,4-trimethyl pentyl dithiophosphinate, di-2,4,4-trimethyl pentyl monothiophosphinate, di-dodecyl dithiocarbamate, dioctyl dithiocarbamate, butoxycarbonyl octyl thionocarbamate, butyl octyl thionocarbamate, butoxycarbonyl octyl thiourea, butoxycarbonyl octyl dithiocarbamate, butoxycarbonyl dodecyl dithiocarbamate, 2-ethylhexyl allyl xanthate ester or combinations thereof.

7. The method according to claim 1, wherein said collector material includes sodium, potassium, or ammonium salts of hydrocarbyl substituted xanthic acids, dithiocarbamic acids, dithiophosphoric acids, dithiophosphinic acids, monothiophosphoric acids, monothiophosphinic acids, mercaptobenzothiazoles, or combinations thereof.

8. The method according to claim 1, further comprising providing said slurry to a fluidized bed flotation cell.

9. The method according to claim 1, wherein intermixing at least one collector material with said sulfide minerals source occurs:

prior to providing said slurry to a fluidized bed flotation cell; or after providing said slurry to a fluidized bed flotation cell.

10. The method according to claim 8, wherein providing said slurry to a fluidized bed flotation cell occurs after at least one of:

sulfide mineral source processing by a primary mill;

sulfide mineral source processing by a secondary mill;

sulfide mineral source processing by a tertiary mill;

sulfide mineral source processing by a ball mill;

sulfide mineral source processing by a rod mill;

sulfide mineral source processing by a regrind mill;

sulfide mineral source processing by a mechanical flotation cell;

sulfide mineral source processing in a roughing stage;

sulfide mineral source processing in a classification stage;

sulfide mineral source processing in a primary crusher;

sulfide mineral source processing in a secondary crusher;

sulfide mineral source processing in a tertiary crusher;

sulfide mineral source processing in a size separation stage;

high-pressure grinding rolls; and a tailings processing stage.

11. The method according to claim 1, wherein an amount of collector material intermixed with the sulfide mineral source is between about 1 gram per ton of sulfide mineral source and about 500 gram per ton of sulfide mineral source.

12. The method according to claim 1, further comprising performing a size separation process on said slurry before flowing a liquid through said slurry to produce a fluidized bed.

13. The method according to claim 1, wherein flowing a second liquid through said slurry to produce a fluidized bed and bubbling a gas through said fluidized bed occur simultaneously.

14. The method according to claim 1, wherein said at least one collector material includes a frother, a surfactant, a pH modifier, a flotation depressant, a rheology modifier, an activator, one or more hydrocarbon oils, or combinations thereof.

15. The method according to claim 1, wherein the sulfide mineral source is comprised substantially of coarse-sized particles having a p80 of 150 μm or greater.

16. The method according to claim 1, wherein the sulfide mineral source is comprised of sulfide ores, tailings, cyclone underflow, sinks, or combinations thereof.

17. A method for flotation recovery of sulfide minerals, the method comprising:

intermixing a sulfide mineral source with a first liquid to produce a slurry;

flowing a second liquid through said slurry to produce a fluidized bed; and intermixing at least one collector material and said sulfide mineral source and bubbling a gas through said fluidized bed to recover sulfide minerals from the sulfide mineral source, wherein said collector material is composed of di-2-ethyl hexyl dithiophosphate, C8-dithiophosphinate, C6-dithiocarbamate, C8-dithiocarbamate, associated sodium salts, associated potassium salts, associated ammonium salts, or combinations thereof.

18. The method according to claim 1, wherein said hydrocarbyl group contains between 8 and 12 carbons.

* * * * *